United States Patent [19]

Kinoshita et al.

[11] Patent Number: 5,149,199

[45] Date of Patent: Sep. 22, 1992

[54] TEMPERATURE DETECTION CIRCUIT USED IN THERMAL SHIELDING CIRCUIT

[75] Inventors: Hitoshi Kinoshita, Kawasaki; Masaru Hashimoto, Yokohama, both of Japan

[73] Assignee: Kabushiki Kaisha Toshiba, Kawasaki, Japan

[21] Appl. No.: 703,833

[22] Filed: May 21, 1991

[30] Foreign Application Priority Data

May 24, 1990 [JP] Japan .................................. 2-134940

[51] Int. Cl.$^5$ .......................... G05F 3/20; H01L 29/78
[52] U.S. Cl. .................... 374/178; 307/310; 307/355; 374/183
[58] Field of Search ................. 374/183, 178; 307/310

[56] References Cited

U.S. PATENT DOCUMENTS

| | | | |
|---|---|---|---|
| 4,350,904 | 9/1982 | Cordell | 307/310 |
| 4,574,205 | 3/1986 | Nagano | 307/310 |
| 4,698,655 | 10/1987 | Schultz | 307/310 X |
| 4,736,125 | 4/1988 | Yuen | 307/310 X |
| 4,789,819 | 12/1988 | Nelson | 307/310 X |

*Primary Examiner*—Daniel M. Yasich
*Attorney, Agent, or Firm*—Oblon, Spivak, McClelland, Maier & Neustadt

[57] ABSTRACT

A temperature detection circuit includes first and second current sources and a comparing circuit. A first current source generates a current having a positive temperature coefficient and flowing in a band gap type voltage source. A second current source generates a current having a zero or negative temperature coefficient. The comparing circuit compares the amounts of currents flowing in the first and second current sources to detect the relation between the magnitudes of the compared currents.

8 Claims, 2 Drawing Sheets

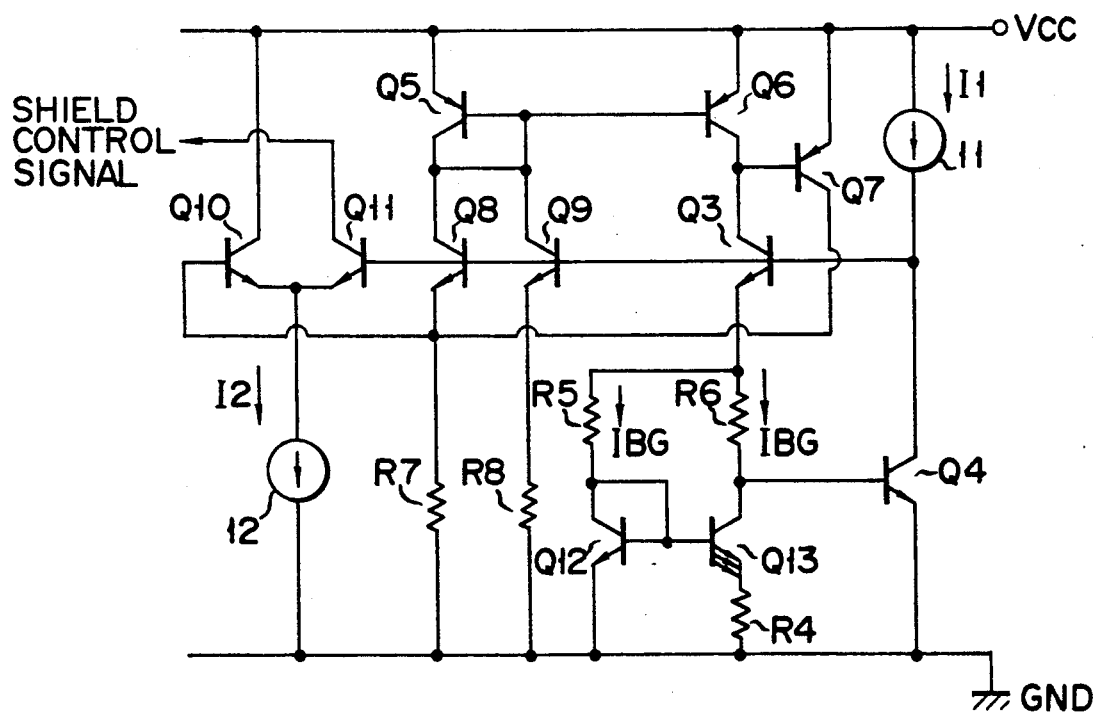
F I G. 2

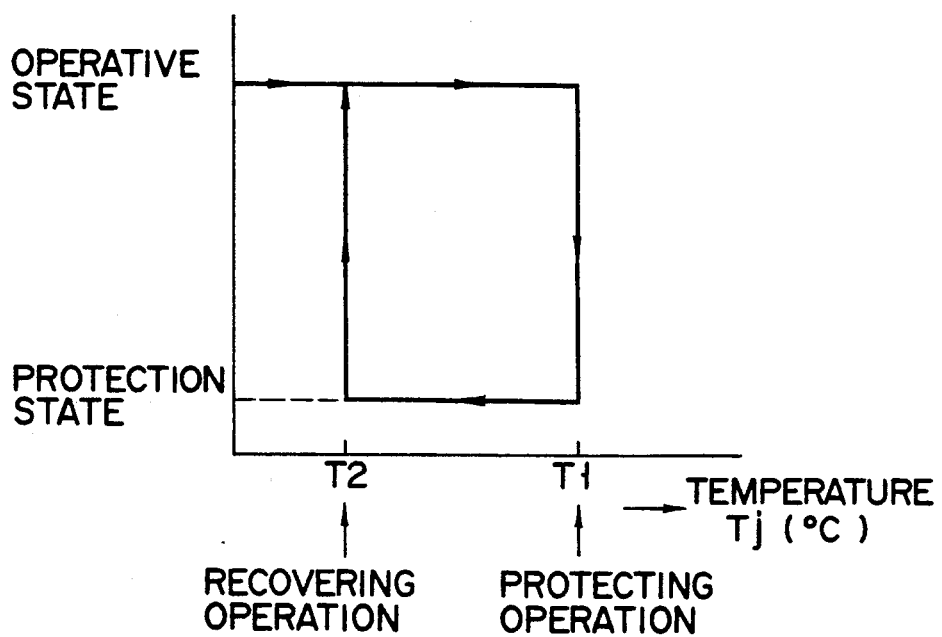
F I G. 3

TEMPERATURE DETECTION CIRCUIT USED IN THERMAL SHIELDING CIRCUIT

BACKGROUND OF THE INVENTION

1. Field of the Invention

This invention relates to a temperature detection circuit used in a thermal shielding circuit, and more particularly to a temperature detection circuit provided together with an integrated circuit having a large power consumption on the same chip, for protecting the circuit from being damaged by heat generated therefrom.

2. Description of the Related Art

Generally, in a case where a circuit such as an acoustic power amplifier and a motor driver circuit having a relatively large power consumption is integrated, the amount of heat generated therefrom is large and the whole circuit is heated, and therefore, much attention should be paid to heat generation than in a case wherein discrete semiconductor elements are used. Therefore, the resistance of an outer casing of the integrated circuit is lowered and a heat radiating plate is used, and in addition, a thermal shielding circuit using a temperature detection circuit is provided to interrupt the circuit operation and protect the integrated circuit in an abnormal high temperature condition.

In FIG. 1, a conventional thermal shielding circuit widely used in an acoustic power amplifier circuit formed in an integrated circuit form is shown. The thermal shielding circuit is constructed to include resistors $R_1$, $R_2$ and $R_3$, Zener diode $Z_1$ and NPN transistors $Q_1$ and $Q_2$. The resistor $R_1$ and Zener diode $Z_1$ are series-connected between a power source Vcc and a ground terminal GND. The base of the transistor $Q_1$ is connected to a connection node between the resistor $R_1$ and the Zener diode $Z_1$ and the collector thereof is connected to the power source Vcc. The resistors $R_2$ and $R_3$ are series-connected between the emitter of the transistor $Q_1$ and the ground terminal GND. The base of the switching transistor $Q_2$ is connected to a connection node between the resistors $R_2$ and $R_3$ and the emitter thereof is connected to the ground terminal GND. A shield control signal is output from the collector of the transistor $Q_2$.

The resistor $R_1$ is provided to determine the magnitude of a bias current supplied to the Zener diode $Z_1$. The resistors $R_2$ and $R_3$ are used to set the detection temperature, are formed of the same type of resistors and are designed by taking the pairing property such as the temperature characteristic into consideration so as to set the ratio of the resistance thereof to a constant value.

The operation of the thermal shield circuit shown in FIG. 1 is effected as is well known in the art so as to detect the temperature by using the temperature characteristics (having a negative temperature characteristic) of base-emitter voltages $V_{F1}$ and $V_{F2}$ of the bipolar transistors $Q_1$ and $Q_2$ and the Zener voltage Vz (having a positive temperature characteristic) of the Zener diode $Z_1$, output a shield control signal when an abnormal high temperature condition is detected, and then interrupt operation of a circuit connected to the succeeding stage. That is, in the normal temperature condition, the base potential of the transistor $Q_2$ which is determined by the Zener voltage Vz, the base-emitter voltage $V_{F1}$ of the transistor $Q_1$ and the ratio of the resistances of the resistors $R_2$ and $R_3$ is set to be lower than the base-emitter voltage $V_{F2}$ of the transistor $Q_2$. As a result, the transistor $Q_2$ is kept in the OFF state at the normal temperature and the circuit connected to the succeeding stage effects the normal operation.

In contrast, when the temperature of the integrated circuit chip rises, the ratio of the resistances of the resistors $R_2$ and $R_3$ can be kept constant even if the resistances thereof are changed by the temperature rise because the resistors $R_2$ and $R_3$ are of the same type of resistor, but at this time, the Zener voltage Vz becomes high and the base-emitter voltage $V_{F1}$ of the transistor $Q_1$ becomes low. As a result, the emitter potential of the transistor $Q_1$ rises and at the same time the base potential of the transistor $Q_2$ also rises. The base-emitter voltage $V_{F2}$ necessary for turning on the transistor $Q_2$ is lowered so that the transistor $Q_2$ may be set in the ON state (or in the saturation state) when the preset temperature is exceeded. The turn-on of the transistor $Q_2$ causes the operation of the circuit connected to the succeeding stage to be interrupted.

The conventional thermal shielding circuit described above supplies a shield control signal to interrupt the operation of the power amplifier circuit when the preset temperature is exceeded, interrupts the protecting operation for the power amplifier circuit when the temperature becomes lower than the preset temperature, and thus the operation of the power amplifier circuit is instantaneously recovered. Therefore, when the protecting operation and recovering operation of the power amplifier circuit are repeatedly effected, an oscillation state is set up with the temperature kept at or near the preset temperature. When the oscillation state is thus set up, a bad influence may be sometimes given to peripheral circuits, and it is not preferable to keep the power amplifier circuit in the protecting state with the temperature kept at the high temperature.

Further, if variation occurs in the Zener voltage Vz of the Zener diode $Z_1$ in the manufacturing process, the base potential of the transistor $Q_2$ varies, causing the preset potential for the protecting operation to be varied.

The conventional thermal shielding circuit described above has a defect that the integrated circuit chip is set into the oscillation state when the protecting operation and recovering or restarting operation of the circuit which is to be protected and which generates heat are repeatedly effected while the temperature is kept at the high temperature near the shielding temperature. Further, if variation occurs in the Zener voltage of the Zener diode, the preset potential for the protecting operation may be varied.

SUMMARY OF THE INVENTION

Accordingly, an object of this invention is to provide a temperature detection circuit capable of suppressing variation in the preset temperature for temperature detection due to variations in the electrical characteristics of an element to be used.

Another object of this invention is to provide a temperature detection circuit which can constitute a thermal shielding circuit capable of preventing a chip from being set into an oscillation state while it is kept at a high temperature near the preset temperature when the protecting operation and restarting operation of a circuit which is formed on the same chip and which generates heat are repeatedly effected.

The above object can be attained by a temperature detection circuit comprising a first current source for generating a current having a positive temperature coefficient and flowing into a band gap type voltage source; a second current source for generating a current having one of zero and negative temperature coefficients; and a comparison circuit for comparing the amount of current from the first current source and the amount of current from the second current source to detect the relation between the magnitudes of the compared currents.

Since the above temperature detection circuit detects the temperature based on the fact that the temperature characteristic of the current source having a positive temperature coefficient associated with the band gap voltage does not depend on the element characteristic but on the temperature characteristic of the thermal voltage $V_T$ which is purely a physical constant, variation in the preset temperature for temperature detection due to variation in the element characteristic can be suppressed.

In a case where a thermal shielding circuit is constructed by use of the temperature detection circuit, the boundary condition between the protecting operation and the restarting operation of the circuit which is formed on the same integrated circuit chip and generates heat can be changed by changing the amount of current from the second current source when detecting that the amounts of current from the first and second current sources have reached preset values, and thus a so-called hysteresis operation can be effected. Therefore, the operation of the circuit which generates heat is interrupted when it is detected that the preset value on the high temperature side is exceeded while the temperature of the integrated circuit chip is changed from the low temperature value to the high temperature value, and then the protecting operation may be terminated when it is detected that the temperature becomes lower than the preset temperature on the low temperature side which is sufficiently lower than the preset temperature on the high temperature side while the temperature of the integrated circuit chip is changed from the high temperature value to the low temperature value. As a result, the thermal shielding circuit can be prevented from being set into the oscillation state while the temperature of the integrated circuit chip is kept at or near the high temperature substantially equal to the preset temperature by repeatedly effecting the protecting operation and the restarting operation for the circuit which generates heat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a circuit diagram showing a thermal shielding circuit having a temperature detection circuit according to one embodiment of this invention; and FIG. 3 is a diagram for illustrating the temperature detection characteristic of the circuit shown in FIG. 2.

DETAILED DESCRIPTION OF THE PREFERRED EMBODIMENTS

Figure 1:
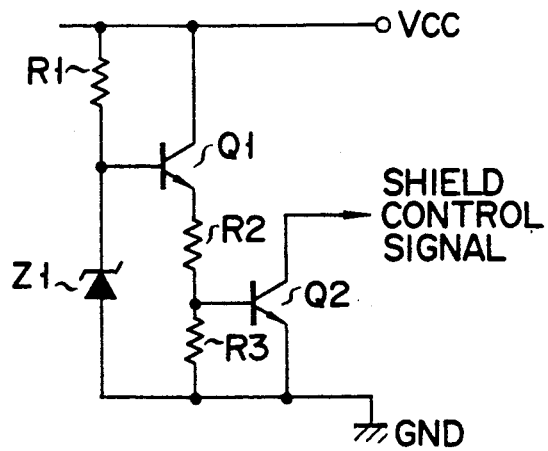
FIG. 1 is a circuit diagram showing the conventional temperature detection circuit.

FIG. 2 shows a thermal shielding circuit having a temperature detection circuit of this invention used in an acoustic power amplifier formed in an integrated circuit configuration. The thermal shielding circuit includes NPN transistors $Q_3$, $Q_4$ and $Q_8$ to $Q_{13}$, PNP transistors $Q_5$ to $Q_7$, resistors $R_4$ to $R_8$, and bias current sources 11 and 12. The collector and base of the transistor $Q_{12}$ are connected to each other and the emitter thereof is connected to the ground terminal GND via the resistor $R_4$. The base of the transistor $Q_{13}$ is connected to the base of the transistor $Q_{12}$ and the emitter thereof is connected to the ground terminal GND via the resistor $R_4$. The ratio of the emitter areas of the transistors $Q_{12}$ and $Q_{13}$ is set to be 1:N (N=positive integer) and the collectors of the transistors $Q_{12}$ and $Q_{13}$ are connected to one-side ends of the resistors $R_5$ and $R_6$. The emitter of the transistor $Q_3$ is connected to the other ends of the resistors $R_5$ and $R_6$. Further, the base of the transistor $Q_4$ is connected to the collector of the transistor $Q_{13}$ and the emitter thereof is connected to the ground terminal GND. The bias current source 11 for generating a bias current $I_1$ is connected between the power source Vcc and the collector of the transistor $Q_4$. The emitters of the transistors $Q_5$, $Q_6$ and $Q_7$ are connected to the power source Vcc and the collector of the transistor $Q_6$ is connected to the collector of the transistor $Q_3$ and the base of the switching transistor $Q_7$. The base and collector of the transistor $Q_5$ are connected to each other and the connection node thereof is connected to the collectors of the transistors $Q_8$ and $Q_9$. The resistors $R_7$ and $R_8$ are respectively connected between the emitters of the transistors $Q_8$ and $Q_9$ and the ground terminal GND. The emitters of the transistors $Q_{10}$ and $Q_{11}$ are connected together, and the bias current source 12 for permitting flow of current $I_2$ is connected between the emitter common connection node and the ground terminal GND. The collector of the transistor $Q_{10}$ is connected to the power source Vcc, and the base thereof is connected to the emitter of the transistor $Q_8$ and the collector of the transistor $Q_7$. The bases of the transistors $Q_{11}$, $Q_3$, $Q_8$ and $Q_9$ are connected to the collector of the transistor $Q_4$. The collector of the transistor $Q_{11}$ serves as a power source for a bias circuit in an acoustic power amplifier circuit (not shown) formed on the same chip of the thermal shielding circuit.

In the thermal shielding circuit with the above construction, the transistor $Q_3$ acts as the first current source for generating a current having a positive temperature coefficient and flowing in the band gap type voltage source. The transistors $Q_8$ and $Q_9$ act as the second current source for generating a current having zero or negative temperature coefficient. The transistors $Q_5$ to $Q_7$, $Q_{10}$ and $Q_{11}$ and the current source 12 function as a comparator circuit for comparing the amounts of currents in the above two current sources to detect the relation in magnitude between the amounts of currents.

The transistors $Q_{12}$, $Q_{13}$, $Q_3$ and $Q_4$, the resistors $R_4$ to $R_6$, and the bias current source 11 constitute a band gap type voltage source, and the sizes of the above transistors, the resistances of the resistors, and the current value of the current source are so determined that the emitter potential $V_{BG}$ of the transistor $Q_3$ will become a voltage having no temperature characteristic. In this case, a current $I_{BG}$ flowing in the resistors $R_5$ and $R_6$ can be expressed as follows:

$$I_{BG} = \frac{V_T \cdot \ln N}{R_4} \quad (1)$$

A current $I_3$ flowing in the transistor $Q_3$ can be expressed as follows:

$$I_3 = 2 \cdot I_{BG} \frac{2 \cdot V_T \cdot \ln N}{R_4} \quad (2)$$

where N denotes the ratio of the emitter areas of the transistors $Q_{12}$ and $Q_{13}$.

Further, a current $I_5$ flowing in the transistor $Q_5$ can be derived as follows:

$$I_5 = \frac{V_{BG}}{R_7} + \frac{V_{BG}}{R_8} \quad (3)$$

Further, a current $I_6$ which is equal to the current $I_5$ may flow in the transistor $Q_6$ which is connected to the transistor $Q_5$ in a current mirror fashion.

The current $I_3$ has the positive temperature coefficient and $I_5$ has the zero or negative temperature characteristic, but the resistances of the resistors $R_7$ and $R_8$ are so determined that the following expression (4) can be satisfied at the normal temperature and the following expression (5) can be satisfied at temperatures higher than a desired preset temperature.

$$I_3 < I_5 (= I_6) \quad (4)$$
$$I_3 \geq I_5 (= I_6) \quad (5)$$

Therefore, since $I_3 < I_5$ at the normal temperature, the transistor $Q_7$ is set in the OFF state and the base potential of the transistor $Q_{10}$ is raised by means of the transistor $Q_8$. In this case, since the transistors $Q_{10}$ and $Q_{11}$ and the current source 12 constitute a differential amplifier, the emitter-base voltage $V_{F8}$ of the transistor $Q_8$ appears between the bases of the transistors $Q_{11}$ and $Q_{10}$ at the normal temperature. Therefore, the transistor $Q_{10}$ is turned off and the transistor $Q_{11}$, and the power amplifier circuit which is controlled by the collector current (shield control signal) of the transistor $Q_{11}$ is set into the normal operative state.

In contrast, when the temperature becomes higher than the preset temperature, the transistor $Q_7$ is turned on since $I_3$ becomes equal to or larger than $I_5$, and the base potential of the transistor $Q_{10}$ rises to turn on the transistor $Q_{10}$ and turn off the transistor $Q_{11}$. As a result, the power amplifier circuit which is controlled by the collector current (shield control signal) of the transistor $Q_{11}$ is set into the nonoperative state (protection state). At this time, since the base-emitter voltage $V_{F8}$ of the transistor $Q_8$ is inverted and the transistor $Q_8$ is turned off, the current $I_5$ flowing in the transistor $Q_5$ is further reduced by a corresponding amount. As a result, the protecting operation is terminated at a temperature which is made sufficiently lower than the preset temperature at the time of transition from the high temperature to the low temperature.

FIG. 3 is a diagram for illustrating the temperature detection characteristic of the temperature detection circuit shown in FIG. 2 and shows the relation between the temperature Tj of the PN junction of the integrated circuit chip and the operative state of the acoustic power amplifier circuit. As shown in the drawing, according to the thermal shielding circuit of the above construction, it is possible to change the boundary condition between the protecting operation and the restarting operation of the power amplifier circuit by detecting that the amount of currents $I_3$ and $I_5$ have reached a preset value and changing the current $I_5$ and thus provide a hysteresis characteristic with respect to temperature. As a result, in a case where the temperature of the integrated circuit chip is changed from the low temperature to the high temperature, the operation of the power amplifier circuit is interrupted when the first preset temperature $T_1$ (for example, 150° C.) is exceeded, and in a case where the temperature is changed from the high temperature to the low temperature, the protection operation is terminated when the temperature becomes lower than the second preset temperature $T_2$ (for example, 100° C.) which is sufficiently lower than the first preset temperature $T_1$ so as to recover the normal operative state. The hysteresis width of the hysteresis characteristic can be easily set by adjusting the resistance of the resistor $R_4$.

Therefore, the thermal shielding circuit can be prevented from being set into the oscillating state with the temperature of the integrated circuit chip kept at high temperatures equal to or near the preset temperature by repeatedly effecting the protecting operation and the recovering operation of the power amplifier circuit.

Further, since the temperature characteristic of the thermal shielding circuit is determined by the temperature characteristic of the thermal voltage $V_T$ and the temperature characteristic of the resistors $R_7$ and $R_8$, influence by variation in the element characteristic on the preset temperature of the protection operation and the termination temperature of the protection operation can be sufficiently suppressed.

Accordingly, the temperature detection circuit of this invention can be effectively used particularly in a case where a circuit such as an acoustic power amplifier circuit or a motor driver circuit which has a large power consumption is integrated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A heat-shielding circuit comprising:
   first current source means including a band gap type voltage source having a positive temperature coefficient;
   second current source means for generating a second current having one of zero and negative temperature coefficients;
   comparing means for comparing a first current flowing through the band gap type voltage source and having a positive temperature coefficient with the second current generated by the second current source and having one of the zero and negative temperature coefficients, so as to detect a relationship between the first and second currents, said comparing means determining the necessity for protection when the relationship between the first and second currents has reversed and supplying a shield control signal to a protection-requiring circuit to stop operation of the protection-requiring circuit; and switch means for detecting the second current and reducing the amount of the second current when the second current has reached a value corresponding to a temperature indicative of the necessity for protection, thereby reducing a protecting-releasing temperature to be a value lower than a protection-start temperature.

2. A heat-shielding circuit according to claim 1, wherein said first current source means includes a transistor.

3. A heat-shielding circuit according to claim 1, wherein said band gap type voltage source includes a first transistor whose base and collector are connected to each other and whose emitter is connected to a ground terminal; a second transistor having a base connected to the base of said first transistor and having an emitter area different from that of said first transistor; a first resistor connected between the emitter of said second transistor and said ground terminal; a second resistor connected at one end to the collector of said first transistor; a third resistor connected at one end to the collector of said second transistor; a third transistor having a base connected to the collector of said second transistor and an emitter connected to said ground terminal; a first current source connected between the collector of said third transistor and a power source; and a fourth transistor having an emitter connected to the other ends of said second and third resistors and a base connected to the collector of said third transistor; and said fourth transistor serves as said first current source means.

4. A heat-shielding circuit according to claim 3, wherein said second current source means includes a fifth transistor having a base connected to the base of said fourth transistor and an emitter connected to said ground terminal via a fourth resistor; and a sixth transistor having a base connected to the base of said fourth transistor and an emitter connected to said ground terminal via a fifth resistor.

5. A heat-shielding circuit according to claim 1, wherein said second current source means includes two transistors whose collectors are connected together.

6. A heat-shielding circuit according to claim 1, wherein said comparing means includes a current mirror circuit for supplying the same amount of current to said first and second current source means; and a differential amplifier for comparing the amounts of currents flowing in said first and second current source means and amplifying a difference between the compared current amounts.

7. A heat-shielding circuit according to claim 1, wherein said comparing means includes a first transistor having an emitter connected to a power source, and a base and a collector which are connected to said second current source means; a second transistor having an emitter connected to the power source, a base connected to the base of said first transistor and a collector connected to said first current source means; a third transistor having an emitter connected to the power source and a base connected to the collector of said second transistor; a fourth transistor having a collector connected to the power source and a base connected to the collector of said third transistor; a fifth transistor having an emitter connected to the emitter of said fourth transistor and a base connected to receive the common bias current of said first and second current source means; and a current source connected between a ground terminal and an emitter common connection node between said fourth and fifth transistors; and an output signal is derived from the collector of said fifth transistor.

8. A heat-shielding circuit according to claim 1, wherein said first current has a value smaller than that of the second current at room temperature, and has a value larger than that of the second current at a high temperature indicative of the necessity for protection.

* * * * *